United States Patent
Maniglia et al.

(10) Patent No.: US 11,882,342 B2
(45) Date of Patent: *Jan. 23, 2024

(54) MESSAGE PROCESSING USING A CLIENT-SIDE CONTROL GROUP

(71) Applicant: Roku, Inc., San Jose, CA (US)

(72) Inventors: Drew Maniglia, Los Gatos, CA (US); Lauren Pendo, Los Gatos, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/188,203

(22) Filed: Mar. 22, 2023

(65) Prior Publication Data

US 2023/0224553 A1 Jul. 13, 2023

Related U.S. Application Data

(63) Continuation of application No. 16/102,957, filed on Aug. 14, 2018, now Pat. No. 11,641,513.

(Continued)

(51) Int. Cl.
*H04L 43/0876* (2022.01)
*H04N 21/81* (2011.01)
(Continued)

(52) U.S. Cl.
CPC ..... *H04N 21/8126* (2013.01); *H04L 43/0876* (2013.01); *H04N 21/262* (2013.01); *H04N 21/4532* (2013.01); *H04N 21/812* (2013.01)

(58) Field of Classification Search
CPC ........... H04N 21/8126; H04N 21/8166; H04N 21/262; H04N 21/4532; H04L 43/0876;
(Continued)

(56) References Cited

U.S. PATENT DOCUMENTS

| 9,087,521 | B2 | 7/2015 | Reynolds |
| 9,324,094 | B1 | 4/2016 | Chalawsky |

(Continued)

FOREIGN PATENT DOCUMENTS

| CA | 3002446 A1 * | 9/2000 | ......... H04N 21/4345 |
| CA | 2839236 A1 | 1/2013 | |
| WO | WO 2017/044259 A1 | 3/2017 | |

OTHER PUBLICATIONS

Extended European Search Report directed to related European Patent Application No. 18846745.0, dated Mar. 24, 2021, 8 pages.

(Continued)

*Primary Examiner* — Khanh Q Dinh
(74) *Attorney, Agent, or Firm* — Sterne, Kessler, Goldstein & Fox P.L.L.C.

(57) ABSTRACT

Disclosed herein are system, apparatus, article of manufacture, method, and/or computer program product embodiments for processing of messages at a media device for analysis purposes. An embodiment operates by transmitting a message request from a media device to a messaging server. In response, the media device receives a message response containing a message and messenger identifier. The media device generates a hash value of an identifier associated with the media device and the messenger identifier. The media device then determines whether the hash value maps into a control group. Finally, the media device processes the message based on whether the hash value maps into the control group.

17 Claims, 3 Drawing Sheets

Related U.S. Application Data

(60) Provisional application No. 62/547,470, filed on Aug. 18, 2017.

(51) Int. Cl.
  *H04N 21/45* (2011.01)
  *H04N 21/262* (2011.01)

(58) Field of Classification Search
  CPC .. H04L 43/0882; H04L 41/50; H04L 41/5003
  USPC .......................... 709/220, 224, 225, 226, 227
  See application file for complete search history.

(56) References Cited

U.S. PATENT DOCUMENTS

| | | | | |
|---|---|---|---|---|
| 10,489,855 | B1* | 11/2019 | Mecane | G06Q 40/04 |
| 10,553,239 | B2 | 2/2020 | Reynolds | |
| 10,911,387 | B1* | 2/2021 | Al Majid | H04L 51/42 |
| 11,102,244 | B1* | 8/2021 | Jakobsson | H04L 51/42 |
| 11,334,371 | B1* | 5/2022 | Eardley | G06F 9/44505 |
| 11,641,513 | B2* | 5/2023 | Maniglia | H04N 21/262 |
| | | | | 709/206 |
| 11,763,744 | B2* | 9/2023 | Du | G09G 3/3233 |
| | | | | 345/214 |
| 11,764,339 | B2* | 9/2023 | Biebersdorf | H01L 33/52 |
| | | | | 257/79 |
| 2002/0032661 | A1 | 3/2002 | Schuba et al. | |
| 2002/0082767 | A1 | 6/2002 | Mintz | |
| 2010/0306043 | A1 | 12/2010 | Lindsay et al. | |
| 2011/0113890 | A1* | 5/2011 | Kurtz | G01L 7/08 |
| | | | | 73/715 |
| 2011/0231240 | A1 | 9/2011 | Schoen et al. | |
| 2013/0188483 | A1 | 7/2013 | Teepell et al. | |
| 2013/0227607 | A1 | 8/2013 | Saltonstall et al. | |
| 2014/0114745 | A1 | 4/2014 | Bruich et al. | |
| 2015/0128157 | A1 | 5/2015 | Hardie | |
| 2015/0135244 | A1 | 5/2015 | Hilson et al. | |
| 2016/0094975 | A1 | 3/2016 | Sheng | |
| 2016/0358312 | A1* | 12/2016 | Kolb, V | G06T 5/003 |
| 2017/0017532 | A1 | 1/2017 | Falco et al. | |
| 2017/0223425 | A1 | 8/2017 | Kitts et al. | |
| 2019/0058925 | A1* | 2/2019 | Maniglia | H04N 21/4532 |
| 2021/0104014 | A1* | 4/2021 | Kolb, V | G06T 5/20 |

OTHER PUBLICATIONS

International Search Report and Written Opinion of the International Searching Authority directed to related International Application No. PCT/US2018/000255, dated Dec. 7, 2018. with attached English-language translation; 14 pages.

\* cited by examiner

MESSAGE PROCESSING USING A CLIENT-SIDE CONTROL GROUP

CROSS-REFERENCE TO RELATED APPLICATIONS

The present application is a continuation of U.S. patent application Ser. No. 16/102,957, filed Aug. 14, 2018, now allowed, which claims the benefit of U.S. Provisional Patent Application No. 62/547,470, titled "Message Processing Using A Client-Side Control Group" filed on Aug. 18, 2017, which are incorporated herein by reference in their entirety.

BACKGROUND

Field

This disclosure is generally directed to controlling the processing of messages for analysis purposes. More particularly, this disclosure relates to controlling the processing of messages at a media device based on the automatic establishment of a control group.

Background

A media system may provide content to one or more media devices from one or more content providers. A user at a media device may select a particular content provider from a list of content providers maintained at a platform server in the media system. The media device may receive content from the selected content provider. For example, a media device may receive a streaming movie from a movie rental provider.

A media system may provide one or more messages from one or more message providers to one or more media devices. Specifically, a media device may receive messages from a messaging server during playback of content. For example, a media device may receive a copyright warning, a warning about explicit language and/or content, a public service announcement, or programming information, to name just a few examples. The messages may be created by different message providers, including the operator of the media system itself and any of the content providers.

A user of a media device may perform various actions in response to receiving a message. For example, a user may choose to view content associated with the message, perform an operation based on the message, or provide personal information. A message provider may want to measure the effect of a message on a user performing various actions. The message provider may measure the effect by withholding a random set of users from receiving messages. The message provider may then compare user performance of various actions with and without receiving the messages.

BRIEF SUMMARY

Provided herein are system, method and/or computer program product embodiments, and/or combinations and sub-combinations thereof, for the processing of messages at a media device for analysis purposes. An embodiment operates by transmitting a message request from a media device to a messaging server. In response, the media device receives a message response containing a message and messenger identifier. The media device generates a hash value of an identifier associated with the media device and the messenger identifier. The media device then determines whether the hash value maps into a control group. Finally, the media device processes the message based on whether the hash value maps into the control group. Because the media device automatically establishes a control group for withholding the processing of messages, a messaging provider may analyze the impact of messages without modifying the operation of messaging server itself. Moreover, because the messaging server does not need to be modified to establish a control group, the messaging server may avoid the computation and memory overhead associated with establishing a control group. This is beneficial because the processing and memory usage associated with establishing a control group may cause the messaging server to be unable to deliver messages to many media devices simultaneously in real-time. Accordingly, this disclosure addresses and solves a technological problem (e.g., the inability to establish a control group at a messaging server to process messages) using a technological solution (e.g., establishing a control group at a media device to process messages) to achieve improvements in technology (e.g., avoiding computation and memory overhead associated with establishing a control group, to better enable the messaging server to deliver messages to multiple media devices simultaneously in real-time). This disclosure further reduces the manual overhead associated with producing a control group. This generates an increase in scalability.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
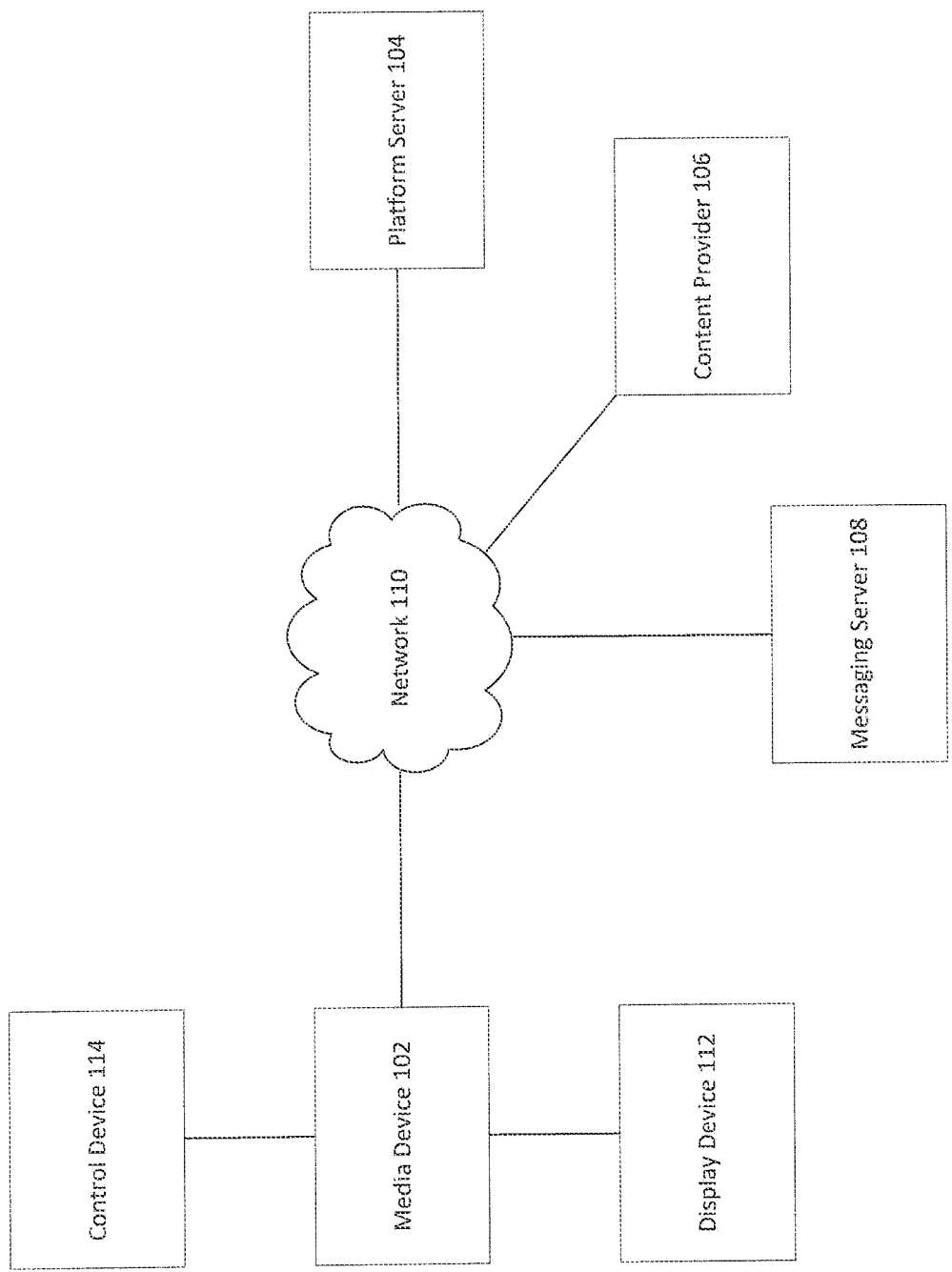
FIG. 1 illustrates a block diagram of a media system for controlling the processing of messages at a media device, according to an example embodiment.

FIG. 1 illustrates a block diagram of a media system 100, according to an example embodiment. Media system 100 can include a media device 102, a platform server 104, a content provider 106, and a messaging server 108. As would be appreciated by a person of ordinary skill in the art, there may be one or more media devices 102, one or more content providers 106, and one or more messaging servers 108.

In FIG. 1, media device 102, platform server 104, content provider 106, and messaging server 108 are connected via network 110. In some embodiments, network 110 can include, without limitation, a wired and/or wireless computer and/or telecommunications network which can enable coupled and/or interconnected systems and/or devices to communicate information between and among each other. In some embodiments, network 110 can include, without limitation, intranet, extranet, Internet, and/or any other local, regional, global telecommunications network.

In some embodiments, media device 102 can include, but is not limited to, a desktop computer, streaming media device, laptop, smartphone, touchpad, wearable electronic device, smart watch, set-top box, or other smart electronic device. Media device 102 can be configured to acoustically, graphically, and/or visually present content received over network 110 from platform server 104, content source 106, and/or messaging server 108 on display device 112. In some embodiments, display device 112 can be integrated with, operatively coupled to, and/or connected to media device 102.

In some embodiments, media device 102 can be communicatively coupled to control device 114. In some embodiments, control device 114 can be configured to communicate user input information to media device 102. Control device 114 can be configured to use one or more wired and/or wireless communication protocols and/or standards, which can include, without limitation, infrared (IR) protocols and/or standards, radio frequency (RF) protocols and/or standards, and/or Bluetooth protocol and/or standard to communicate with media device 102. In some embodiments, control device 114 can be further configured to enable a user of media device 102 to navigate, select, or otherwise interact with various content received from platform server 104, content source 106, and/or messaging server 108 which is presented on display device 112. In some embodiments, control device 114 can include, without limitation, a remote control and/or mobile device.

In some embodiments, platform server 104 can be configured to provide content from content provider 106 to media device 102. Specifically, media device 102 can communicate with platform server 104 to request specific content from content provider 106 for aural and/or graphical presentation on display device 112. In some embodiments, content provider 106 can include content organized in one or more content datastores. In some embodiments, the content can include music, video, multimedia, still pictures, text, graphics, gaming applications, and other types of content as would be appreciated by a person of ordinary skill in the art.

In some embodiments, platform server 104 can be configured to maintain information about content available at content provider 106. In some embodiments, platform server 104 can be configured to maintain content location information which can include, without limitation, network address and/or path of content stored within content provider 106. In some other embodiments, platform server 104 can be configured to maintain network location information of content source 106 while the specific locations of corresponding content are managed locally by content source 106.

In some embodiments, media device 102 can communicate with platform server 104 to request content available at content provider 106. In some embodiments, platform server 104 can provide content location information to media device 102, and media device 102 can subsequently request the specific content from content source 106. Media device 102 can receive at least a portion of the specific content transmitted or streamed by content source 106 via network 110 for aural and/or graphical presentation on display device 112. In some other embodiments, platform server 104 can provide the network location information of content provider 106 to media device 102, and media device 102 can subsequently request the specific content from content source 106. Media device 102 can receive at least a portion of the specific content transmitted or streamed by content source 106 via network 110 for aural and/or graphical presentation on display device 112.

In some embodiments, platform server 104 can be configured to determine that specific content requested by media device 102 from content source 106 should be provided with one or more messages from messaging server 108. In some embodiments, messaging server 108 may contain one or more messages from one or more message providers. For example, a message can include a station identifier, pre-media content, a warning (such as a copyright warning, warning about explicit language and/or content in the requested media content, and/or other warning), public service announcement, programming information, an advertisement, a commercial, instructions, and/or any other content as would be appreciated by a person of ordinary skill in the art. In some embodiments, messaging server 108 may be a messaging server that implements various standards such as the Digital Video Ad Serving Template (VAST) standard of the Interactive Advertising Bureau (IAB).

In some embodiments, in response to determining that specific content requested by media device 102 should be provided with one or more messages from messaging server 108, platform server 104 can be configured to provide message location information including the network address and/or path of messaging server 108 to media device 102, and media device 102 can subsequently directly request the specific messages from messaging server 108. Media device 102 can receive at least a portion of the messages transmitted or streamed by messaging server 108 via network 110 for processing. In some embodiments, media device 102 may aurally and/or graphically present the messages on display device 112. In some other embodiments, in response to determining that specific content requested by media device 102 should be provided with one or more messages from messaging server 108, platform server 104 can request the specific messages from messaging server 108 via network 110, receive at least a portion of the specific messages, and transmit or stream the at least a portion of the specific messages to media device 102 via network 110. In some embodiments, media device 102 may play a message prior to, during, or after the requested specific content. As would be appreciated by a person of ordinary skill in the art, any number or arrangement of messages can be delivered with the requested content to media device 102.

A message provider may want to provide messages to a media device 102 for a variety of reasons. A message provider may want to provide messages containing legal notices in order to deter copyright infringement. A message provider may want to provide messages containing content warnings in order to satisfy government content regulation guidelines. A message provider may want to provide messages containing pubic announcements in order to be in compliance with government regulations. A message provider may want to provide messages containing future programming to enhance the viewing experience of a user of media device 102. A message provider may want to provide messages containing advertisements to promote the sale of products and/or services to a user of media device 102. Thus, a message provider has many reasons to provide messages to a media device 102 along with requested content.

A message provider may also want to measure the impact of various messages on whether a user of media device 102 performs the action(s) indicated or suggested by the messages.

In some embodiments, a message provider may measure the impact of a message on whether a user of media device 102 performs various actions using A/B testing. A/B testing is a randomized experiment with two variables, A and B, which are the control and test variables in an experiment. The goal of A/B testing is to identify changes to content (that is, messages) that increase or maximize an outcome of interest, e.g., click-through rate for an advertisement message. A/B testing involves testing a subject's response to the two variables, which are identical except for one variation that might affect a user's behavior, and determining the difference in effectiveness of the two variables.

In some embodiments, a message provider may use A/B testing to measure the impact of a message on whether a user of media device 102 performs various actions. Specifically, in an embodiment, a message provider may automatically withhold messages from a certain percentage of users. This control group of users may instead receive generic messages. For example, a message provider may automatically withhold a future programming message related to a soon to be released movie from a user of media device 102. This user may instead receive a generic future programming message that does not explicitly mention the movie. In this example, A/B testing would monitor the extent to which users who received the movie-specific message requested the movie, versus users who received the generic message. A/B testing enables a message provider to actually measure the impact of a specific message, or series of messages, on user behavior over a given period of time.

Conventional media systems, however, are unable to provide A/B testing to measure the impact of a specific message, or series of messages, on user behavior, without substantial system overhead and/or user involvement. This is due to several reasons. First, conventional media systems often use a messaging server operated by a third-party to provide messages to media devices. Message providers are often unable to modify such a messaging server to withhold a random set of users from receiving messages because they do not have permission from the third-party. Second, conventional media systems often use a messaging server that implements a specific messaging server standard. For example, a messaging server may implement the Video Ad Serving Template (VAST) specification of the Interactive Advertising Bureau (IAB). Message providers are often unable to modify such a messaging server to withhold a random set of users from receiving messages because doing so would violate a messaging server standard. Finally, even if a message provider could modify a messaging server to withhold a random set of users from receiving messages, the messaging server may be unable to transmit the messages in real-time to media devices because of the computation and memory overhead associated with withholding a random set of users from receiving messages. In summary, conventional media systems fail to adequately address the technological problem of being unable to establish a control group at a messaging server to process messages.

To solve this technological problem, in some embodiments, media device 102 may be configured to use a hashing mechanism to process messages according to a control group. Because media device 102 establishes the control group for message processing, no changes need to be made to messaging server 108 in media system 100.

In some embodiments, media device 102 may be configured to process a message according to a control group by first issuing a message request for one or more messages from messaging server 108. This message request may be issued in response to an attempt to playback content from content provider 106. In some embodiments, the message request may conform to a message request of the VAST specification.

In some embodiments, media device 102 may determine the location of messaging server 108 from platform server 104. Specifically, platform server 104 may provide messaging server location information including network address and/or path of messaging server 108 to media device 102. Platform server 104 may provide this messaging server location information in response to a request by media device 102 to playback content from content provider 106.

In some embodiments, in response to issuing a message request to messaging server 108, media device 102 may receive a message response from messaging server 108. In some embodiments, the message response may conform to the VAST specification. The message response may include a message and a messenger identifier. The message may represent the message content that is to be played back by media device 102. The messenger identifier may be an identifier of a message provider who is providing the message. For example, the message identifier may be an advertiser identifier, such as an advertiser identifier in the VAST specification. In some embodiments, the messenger identifier may be an identifier for a collection of related messages associated with a given message provider.

In some embodiments, media device 102 may use an identifier associated with media device 102 and the messenger identifier to determine whether the associated message should be withheld from processing or not. In other words, media device 102 may use the identifier associated with media device 102 and the messenger identifier to determine whether the message belongs to a control group. A message that maps to the control group may be withheld from processing by media device 102, whereas a message that does not map to the control group may be processed by media device 102. The is establishment of a control group for message processing enables a message provider to measure the impact of a particular message, or series of message, on user performance of actions.

In some embodiments, the identifier associated with the system may be a user identifier representing a user currently using media device 102. As would be appreciated by a person of ordinary skill in the art, media device 102 may have multiple users. In some other embodiments, the identifier associated with the system may be a system identifier for media device 102, such as an electronic serial number.

In some embodiments, media device 102 may determine whether a message maps to a control group using a concatenation and hashing process. Specifically, media device 102 may concatenate the identifier associated with media device 102 and the messenger identifier into a single value. Media device 102 may then generate a hash value of the concatenated value using a hash function. The hash function may be Message Digest 5 (MD5), Secure Hash Algorithm 1 (SHA1), or various other hash functions as would be would be appreciated by a person of ordinary skill in the art. In some embodiments, media device 102 may convert the resulting hash value into an integer value.

In some embodiments, media device 102 may determine whether the resulting hash value maps into a control group using modular arithmetic. More specifically, media device 102 may determine whether the resulting hash value belongs to the same equivalence class as a number X modulo Y where is X is a random number and Y represents a threshold value that controls the size of the control group. In other words, the control group is represented by the equivalence class in modular arithmetic. For example, when the identifier associated with media device 102 represents a user, and variable Y is 100, roughly 1 percent of users will be withheld from message processing. This is because the resulting hash value will belong to the same equivalence class (or control group) as a number X modulo 100 roughly 1 percent of the time. As would be appreciated by a person of ordinary skill in the art, the combination of the identifier associated with the system and the messenger identifier may be mapped to a control group in various other ways.

In some embodiments, the threshold value may be set by media device 102 itself. In some other embodiments, the threshold value may be set by platform server 104 and transmitted to media device 102 during playback of content from content provider 106. In some other embodiments, the threshold value may be included in the message response sent by messaging server 108 to media device 102.

In some embodiments, media device 102 may process a message based on the resulting hash value not mapping to the control group. For example, media device 102 may display the message on display device 112. Alternatively, in some embodiments, media device 102 may withhold, or not process a message, based on the resulting hash value mapping to the control group.

In some embodiments, media device 102 may transmit an error message to messaging server 108 in response to the resulting hash value mapping to the control group. The error message may indicate to messaging server 108 that media device 102 did not process the message. In some embodiments, the error message may be a VAST error response message. In some embodiments, if messaging server 108 receives two or more error messages from media device 102, messaging service 108 may provide a generic message to media device 102 when it receives the next message request from media device 102.

In some embodiments, media device 102 may issue a second message request for one or more messages from messaging server 108 in response to the resulting hash value mapping to the control group. In response to the second message request, media device 102 may receive a second message response. Media device 102 may then determine whether to process this second message based on whether the second message maps to a control group using the same concatenation and hashing process described above.

In some embodiments, media device 102 may log various information about a message being withheld from processing in order to enable a message provider to measure the effectiveness of the message. Specifically, in some embodiments, media device 102 may transmit a pixel tag message to messaging server 108 after determining the message should be withheld. Alternatively, in some other embodiments, media device 102 may transmit a pixel tag message to platform server 104 after determining the message should not be withheld. A pixel tag message may represent a log entry containing the identifier associated with media device 102, a timestamp representing when the message was received, the messenger identifier associated with the message, and a binary flag indicating whether the message was withheld or not. As would be appreciated by a person of ordinary skill in the art, a pixel tag message may contain other logging information.

In some embodiments, a pixel tag message is a tracking code that is sent to messaging server 108 or platform server 104. The pixel tag message may indicate whether the associated message was rejected or delivered to media device 102. For example, in some embodiments, this enables messaging server 108 or platform server 104 to determine that media device 102 displayed or did not display the associated message. For example, if media device 102 rejects a message targeted to a control group for new users, messaging server 108 or platform server 104 may determine the associated user is a new user because she was originally scheduled in this control group.

By logging whether a message was withheld from processing at media device 102, message providers can determine which users received the message and which users were part of the control group. In some embodiments, this may enable a message provider to calculate the impact of the message on user behavior in real-time. In some other embodiments, this may enable a message provider to calculate the impact of the message on user behavior after a lag period of time, e.g., a 12 hour lag period of time. As would be appreciated by a person of ordinary skill in the art, a message provider may calculate the impact of the message using various mechanisms including, but not limited to, click-through rate, subscriptions bought, and/or viewing time. Moreover, while logging may simplify the process of determining which users received the message and which users were part of the control group, message providers can determine whether a message was withheld from processing at a media device 102 or processed at a media device 102 without logging. This determination may be based on an identifier associated with the media device 102, a messenger identifier, and hash value range as discussed herein.

Figure 2:
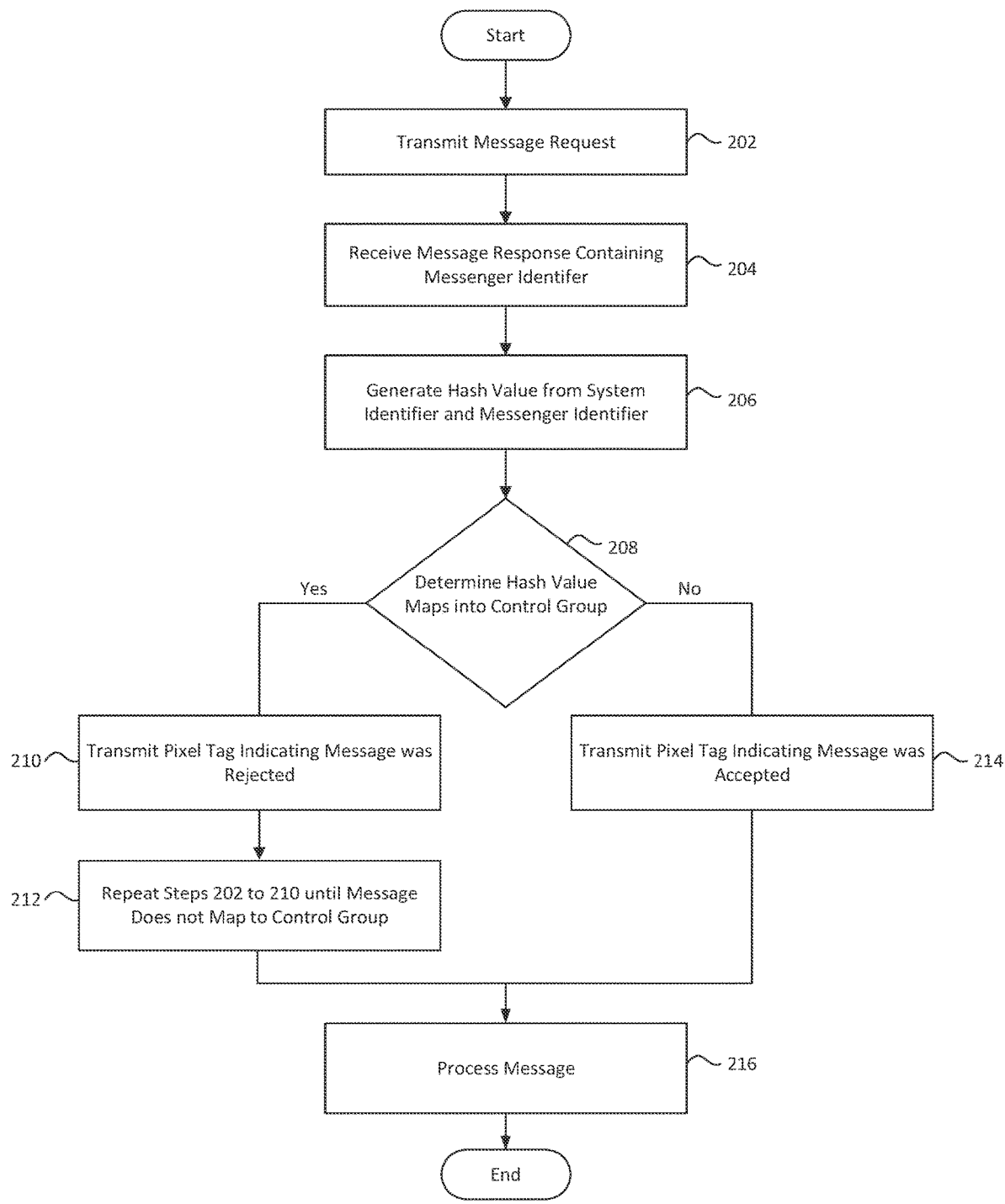
FIG. 2 is a flowchart illustrating a process for controlling the processing of messages at a media device, according to an example embodiment.

FIG. 2 is a flowchart for a method 200 for processing a message according to a control group at media device 102, according to an embodiment. Method 200 can be performed by processing logic that can comprise hardware (e.g., circuitry, dedicated logic, programmable logic, microcode, etc.), software (e.g., instructions executing on a processing device), or a combination thereof. In some embodiments, method 200 is performed by media device 102, which can be implemented by a computer system such as computer system 400 (described below).

In 202, media device 102 transmits a message request to messaging server 108. The message request may be issued in response to an attempt to playback content from content provider 106. In some embodiments, the message request may conform to a message request of the VAST specification.

In 204, media device 102 receives a message response from messaging server 108. The message response may include a message and a messenger identifier. The message may represent the message content that is to be played back by media device 102. The messenger identifier may be an identifier of a message provider who is providing the message. In some embodiments, the message response may conform to the VAST specification.

In 206, media device 102 generates a hash from an identifier associated with itself (that is, media device 102), and the received messenger identifier. In some embodiments, media device 102 concatenates its identifier and the received messenger identifier into a single value. Media device 102 then generates a hash value of the concatenated value using a hash function. The hash function may be MD5, SHA1, or various other hash functions as would be would be appreciated by a person of ordinary skill in the art.

In 208, media device 102 determines whether the resulting hash value maps into a control group. In some embodiments, media device 102 determines whether the resulting hash value maps into a control group using modular arithmetic. For example, media device 102 may determine whether the resulting hash value belongs to the same equivalence class as a number X modulo Y, where is X is a random number and Y represents a threshold value that controls the size of the control group. As would be appreciated by a person of ordinary skill in art, the threshold value may be set to various values depending on the percentage of media devices and/or users sought to be withheld from messaging processing.

If it is determined in step 208 that the resulting hash value maps into a control group, then in 210, media device 102 may optionally transmit a pixel tag message to platform server 104 and/or messaging server 108 indicating the message was rejected. The pixel tag message may represent a log entry containing the identifier associated with media device 102, a timestamp representing when the message was received, the messenger identifier associated with the message, and a binary flag indicating the message was withheld. Platform server 104 and/or messaging server 108 may log the information in the pixel tag message. As would be appreciated by a person of ordinary skill in the art, a message provider may use this logged information to calculate the impact of the message on user behavior in real-time. For example, a message provider may compare a click-through rate of users in the control group to users in the non-control group based on the logged information.

In some embodiments, however, media device 102 may not explicitly indicate to platform server 104 and/or messaging server 108 that the message was rejected. Rather, media device 102 may proceed directly to step 212.

In 212, after transmitting the pixel tag message in 210, media device 102 repeats steps 202-210 until media device 102 determines that a message does not map to a control group.

If it is determined in step 208 that the resulting hash value does not map into a control group, then in 214, media device 102 transmits a pixel tag message to platform server 104 and/or messaging server 108 indicating the message was accepted. The pixel tag message may represent a log entry containing the identifier associated with media device 102, a timestamp representing when the message was received, the messenger identifier associated with the message, and/or a binary flag indicating the message was processed. Platform server 104 and messaging server 108 may log the information in the pixel tag message. As would be appreciated by a person of ordinary skill in the art, a message provider may use this logged information to calculate the impact of the message on user behavior in real-time. For example, a message provider may compare a subscription sign-up rate of users in the control group to users in the non-control group based on the logged information.

In 216, after transmitting a pixel tag message to platform server 104 and/or messaging server 108 indicating the message was accepted, media device 102 processes the message. As would be appreciated by a person of ordinary skill in the art, media device 102 may process the message in various other ways. For example, in some embodiments, media device 102 may display the message on display device 112 for viewing by users.

EXAMPLE COMPUTER SYSTEM

Various embodiments and/or components therein can be implemented, for example, using one or more well-known computer systems, such as, for example, media device 102, platform server 104, content provider 106, and/or messaging server 108 shown in FIG. 1. Computer system 300 can be any well-known computer capable of performing the functions described herein.

Computer system 300 includes one or more processors (also called central processing units, or CPUs), such as a processor 304. Processor 304 is connected to a communication infrastructure or bus 306.

One or more processors 304 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 can include one or more levels of cache. Main memory 308 has stored therein control logic (i.e., computer software) and/or data.

Computer system 300 can also include one or more secondary storage devices or memory 310. Secondary memory 310 can include, for example, a hard disk drive 312 and/or a removable storage device or drive 314. Removable storage drive 314 can be a floppy disk drive, a magnetic tape drive, a compact disk drive, an optical storage device, tape backup device, and/or any other storage device/drive.

Removable storage drive 314 can interact with a removable storage unit 318. Removable storage unit 318 includes a computer usable or readable storage device having stored thereon computer software (control logic) and/or data. Removable storage unit 318 can be a floppy disk, magnetic tape, compact disk, DVD, optical storage disk, and/any other computer data storage device. Removable storage drive 314 reads from and/or writes to removable storage unit 318 in a well-known manner.

According to an exemplary embodiment, secondary memory 310 can include other means, instrumentalities or other approaches for allowing computer programs and/or other instructions and/or data to be accessed by computer system 300. Such means, instrumentalities or other approaches can include, for example, a removable storage unit 322 and an interface 320. Examples of the removable storage unit 322 and the interface 320 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 can further include a communication or network interface 324. Communication interface 324 enables computer system 300 to communicate and interact with any combination of remote devices, remote networks, remote entities, etc. (individually and collectively referenced by reference number 328). For example, communication interface 324 can allow computer system 300 to communicate with remote devices 328 over communications path 326, which can be wired and/or wireless, and which can include any combination of LANs, WANs, the Internet, etc. Control logic and/or data can be transmitted to and from computer system 300 via communication path 326.

In some embodiments, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Figure 3:
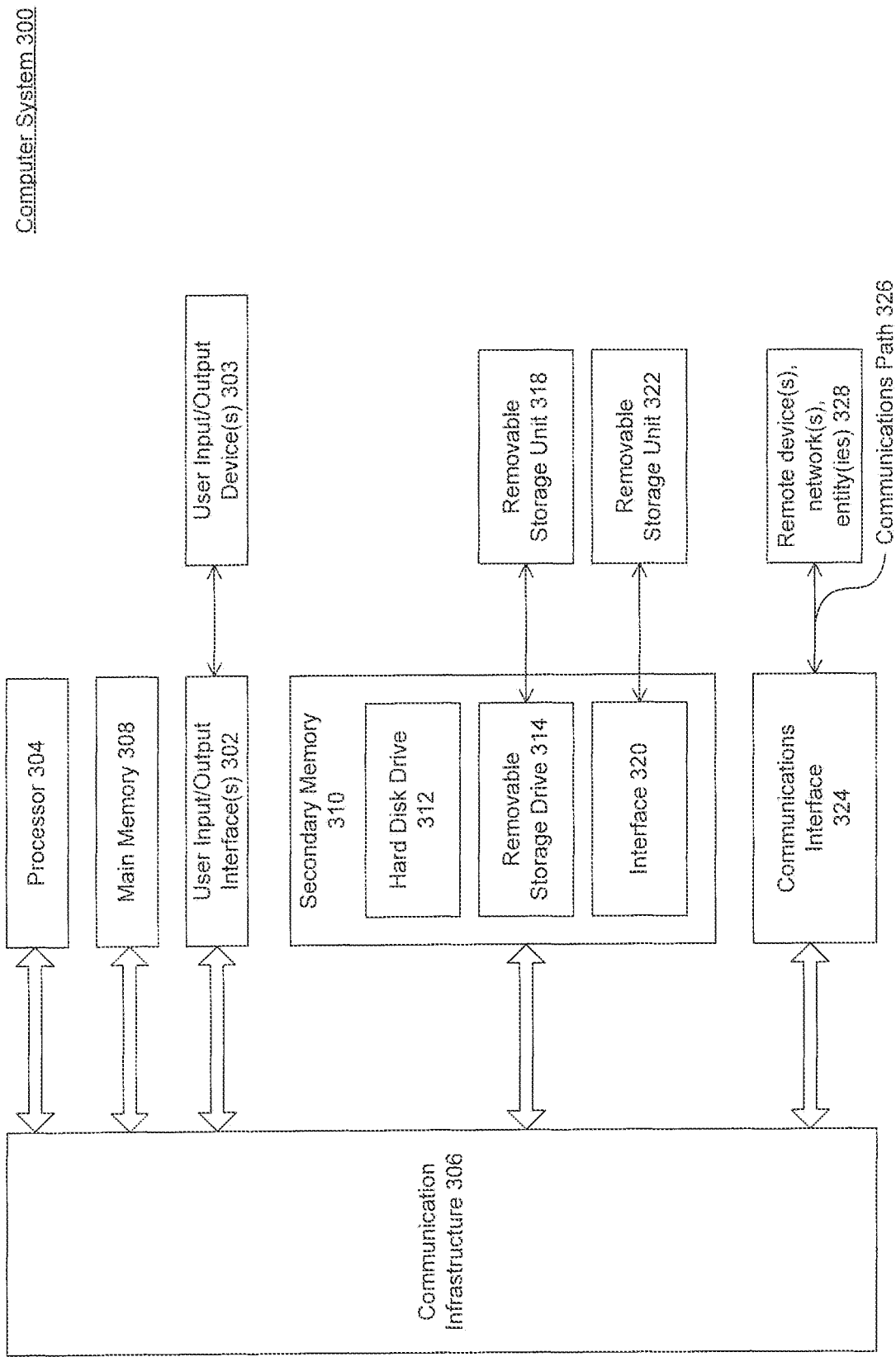
FIG. 3 illustrates an example computer system useful for implementing various embodiments.

Based on the teachings contained in this disclosure, it will be apparent to persons skilled in the relevant art(s) how to make and use embodiments of the invention using data processing devices, computer systems and/or computer architectures other than that shown in FIG. 3. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of the invention should not be limited by any of the above-described exemplary embodiments, but should be defined only in accordance with the following claims and their equivalents.

What is claimed is:

1. A client-side device, comprising:
at least one processor; and
a memory operatively coupled to the at least one processor, the at least one processor configured to:
transmit, over a network, a message request to a messaging server;
receive, at the client-side device, a message response from the messaging server in response to the message request, wherein the message response comprises a message and a messenger identifier;
generate a hash value of an identifier associated with the client-side device and the messenger identifier, wherein the identifier associated with the client-side device specifies a user of the client-side device;
determine the message maps into a control group by determining the hash value maps into the control group; and
transmit a pixel tag to the messaging server based at least in part on the determination that the hash value maps into the control group, wherein the pixel tag comprises an indication that the message was withheld for processing by the client-side device.

2. The client-side device of claim 1, wherein the messaging server implements a Video Ad Serving Template (VAST) specification.

3. The client-side device of claim 1, wherein the at least one processor is further configured to:
determine the hash value maps into the control group based at least in part on an equivalence class in modular arithmetic.

4. The client-side device of claim 1, wherein the at least one processor is further configured to:
transmit an error message to the messaging server based at least in part on the determination that the hash value maps into the control group.

5. The client-side device of claim 1, wherein a size of the control group is defined by a threshold value, and wherein the at least one processor is further configured to:
receive the threshold value from the messaging server or a platform server during playback of content from a content provider by the client-side device.

6. The client-side device of claim 1, wherein the at least one processor is further configured to:
transmit a second message request to the messaging server in response to the determination that the hash value maps into the control group;
receive a second message response from the messaging server in response to the second message request, wherein the second message response comprises a second message and a second messenger identifier;
generate a second hash value of the identifier associated with the client-side device and the second messenger identifier;
determine the second message does not map into the control group by determining the second hash value does not map into the control group; and
display the second message on a display communicatively coupled to the client-side device based at least in part on a determination that the second hash value does not map into the control group.

7. A computer-implemented method, comprising:
transmitting, at a client-side device over a network, a message request to a messaging server;
receiving, at the client-side device, a message response from the messaging server in response to the message request, wherein the message response comprises a message and a messenger identifier;
generating, at the client-side device, a hash value of an identifier associated with the client-side device and the messenger identifier, wherein the identifier associated with the client-side device specifies a user of the client-side device;

determining, at the client-side device, that the message maps into a control group by determining the hash value maps into the control group; and transmitting, by the client-side device, a pixel tag to the messaging server based at least in part on the determination that the hash value maps into the control group, wherein the pixel tag comprises an indication that the message was withheld for processing by the client-side device.

8. The computer-implemented method of claim 7, wherein the messaging server implements a Video Ad Serving Template (VAST) specification.

9. The computer-implemented method of claim 7, further comprising:

determining, by the client-side device, that the hash value maps into the control group based at least in part on an equivalence class in modular arithmetic.

10. The computer-implemented method of claim 7, further comprising:

transmitting, by the client-side device, an error message to the messaging server based at least in part on the determination that the hash value maps into the control group.

11. The computer-implemented method of claim 7, wherein a size of the control group is defined by a threshold value, and further comprising:

receiving, by the client-side device, the threshold value from the messaging server or a platform server during playback of content from a content provider by the client-side device.

12. The computer-implemented method of claim 7, further comprising:

transmitting, by the client-side device, a second message request to the messaging server in response to the determination that the hash value maps into the control group;

receiving, by the client-side device, a second message response from the messaging server in response to the second message request, wherein the second message response comprises a second message and a second messenger identifier;

generating, by the client-side device, a second hash value of the identifier associated with the client-side device and the second messenger identifier;

determining, by the client-side device, the second message does not map into the control group by determining the second hash value does not map into the control group; and displaying, by the client-side device, the second message on a display communicatively coupled to the client-side device based at least in part on a determination that the second hash value does not map into the control group.

13. A non-transitory computer-readable medium having instructions stored thereon that, when executed by at least one client-side computing device, cause the at least one client-side computing device to perform operations comprising:

transmitting, over a network, a message request to a messaging server;

receiving, at the client-side computing device, a message response from the messaging server in response to the message request, wherein the message response comprises a message and a messenger identifier;

generating a hash value of an identifier associated with the at least one client-side computing device and the messenger identifier, wherein the identifier associated with the at least one client-side computing device specifies a user of the at least one client-side computing device;

determining the message maps into a control group by determining the hash value maps into the control group; and transmitting a pixel tag to the messaging server based at least in part on the determination that the hash value maps into the control group, wherein the pixel tag comprises an indication that the message was withheld for processing.

14. The non-transitory computer-readable medium of claim 13, wherein the messaging server implements a Video Ad Serving Template (VAST) specification.

15. The non-transitory computer-readable medium of claim 13, the operations further comprising:

determining that the hash value maps into the control group based at least in part on an equivalence class in modular arithmetic.

16. The non-transitory computer-readable medium of claim 13, the operations further comprising:

transmitting an error message to the messaging server based at least in part on the determination that the hash value maps into the control group.

17. The non-transitory computer-readable medium of claim 13, wherein a size of the control group is defined by a threshold value, and the operations further comprising:

receiving the threshold value from the messaging server or a platform server during playback of content from a content provider by the client-side computing device.

* * * * *